United States Patent
Moran et al.

(10) Patent No.: US 12,547,704 B2
(45) Date of Patent: Feb. 10, 2026

(54) AUTOMATED DEPLOYMENT OF RELOCATABLE CODE BLOCKS AS AN ATTACK COUNTERMEASURE IN SOFTWARE

(71) Applicant: Arm Limited, Cambridge (GB)

(72) Inventors: Brendan James Moran, Coton (GB); Michael Bartling, Austin, TX (US)

(73) Assignee: ARM LIMITED, Cambridge (GB)

( * ) Notice: Subject to any disclaimer, the term of this patent is extended or adjusted under 35 U.S.C. 154(b) by 34 days.

(21) Appl. No.: 18/198,625

(22) Filed: May 17, 2023

(65) Prior Publication Data
US 2024/0386093 A1    Nov. 21, 2024

(51) Int. Cl.
  G06F 21/54    (2013.01)
  G06F 21/53    (2013.01)
  G06F 21/55    (2013.01)

(52) U.S. Cl.
  CPC .............. G06F 21/54 (2013.01); G06F 21/53 (2013.01); G06F 21/554 (2013.01)

(58) Field of Classification Search
  CPC ......... G06F 21/54; G06F 21/53; G06F 21/554
  See application file for complete search history.

(56) References Cited

U.S. PATENT DOCUMENTS

| | | | | |
|---|---|---|---|---|
| 6,549,930 B1 * | 4/2003 | Chrysos | ................ | G06F 9/4881 718/104 |
| 9,392,017 B2 * | 7/2016 | Cui | ...................... | H04L 63/145 |
| 10,359,971 B2 * | 7/2019 | Hegde | ................... | G06F 3/0659 |
| 10,887,340 B2 * | 1/2021 | Cui | ........................ | G06F 21/572 |
| 11,386,012 B1 * | 7/2022 | Krishnaswamy | ..... | G06F 12/109 |
| 11,816,250 B2 * | 11/2023 | Immonen | ................ | G06F 21/52 |
| 2004/0268141 A1 * | 12/2004 | Zimmer | ................. | G06F 21/575 726/17 |
| 2005/0183072 A1 * | 8/2005 | Horning | .................. | G06F 21/10 717/140 |
| 2010/0251226 A1 * | 9/2010 | Sato | ........................ | G06F 8/443 717/146 |
| 2015/0082284 A1 * | 3/2015 | Badea | ................. | G06F 11/3644 717/130 |

(Continued)

FOREIGN PATENT DOCUMENTS

AU    2014318585 A1 *    3/2016    ........... G01N 21/274

*Primary Examiner* — Carl G Colin
(74) *Attorney, Agent, or Firm* — Talem IP Law, LLP

(57) ABSTRACT

A computer implemented method is provided. The computer implemented method includes receiving, for execution by a processing element, a relocatable instrumented code block, the relocatable instrumented code block being code that has undergone instrumentation for a monitoring system, duplicating at least one function of the relocatable instrumented code block to produce a plurality of duplicate relocatable code blocks, allocating the instrumented code block and each duplicate relocatable code block of the plurality of duplicate relocatable code blocks to different locations in a memory on a computing device, creating a relocated mapping of the instrumented code block and each duplicate relocatable code block to their corresponding locations in the memory, and transmitting a copy of the mapping of the instrumented code block and each duplicate relocatable code block to their corresponding locations in memory to the monitoring system.

16 Claims, 9 Drawing Sheets

(56) References Cited

U.S. PATENT DOCUMENTS

| | | | |
|---|---|---|---|
| 2015/0135313 A1* | 5/2015 | Wesie | G06F 21/51 |
| | | | 726/22 |
| 2015/0180882 A1* | 6/2015 | Le | G06F 21/54 |
| | | | 726/23 |
| 2016/0004518 A1* | 1/2016 | Sharma | G06F 8/443 |
| | | | 717/157 |
| 2016/0283345 A1* | 9/2016 | Gounares | G06F 3/0482 |
| 2017/0116418 A1* | 4/2017 | Shanmugavelayutham | |
| | | | G06F 21/567 |
| 2017/0132181 A1* | 5/2017 | Van As | G06F 11/30 |
| 2018/0181379 A1* | 6/2018 | Riche | G06F 8/443 |
| 2019/0068640 A1* | 2/2019 | Araujo | G06F 21/53 |
| 2020/0007575 A1* | 1/2020 | Meriot | H04L 63/1458 |
| 2020/0067861 A1* | 2/2020 | Leddy | G06F 21/6245 |
| 2020/0089502 A1* | 3/2020 | Hong | G06F 8/65 |
| 2020/0356365 A1* | 11/2020 | Pezaris | G06F 8/73 |
| 2021/0049289 A1* | 2/2021 | Garcia Morchon | G06F 21/64 |
| 2021/0150028 A1* | 5/2021 | Kim | G06F 21/556 |
| 2021/0303312 A1* | 9/2021 | Degioanni | G06F 9/3005 |
| 2022/0092171 A1* | 3/2022 | Tsechanski | G06F 21/54 |
| 2022/0197614 A1* | 6/2022 | Sandhupatla | G06F 8/4435 |
| 2024/0045658 A1* | 2/2024 | Bartolotta | G06F 8/443 |
| 2024/0045679 A1* | 2/2024 | Neugschwandtner | G06F 21/54 |
| 2024/0378107 A1* | 11/2024 | Merchant | G06F 11/0793 |

\* cited by examiner

AUTOMATED DEPLOYMENT OF RELOCATABLE CODE BLOCKS AS AN ATTACK COUNTERMEASURE IN SOFTWARE

BACKGROUND

With the ubiquitousness of software, computers, and networked environments, malicious actors have many ways to access confidential information and interfere with devices. Constantly reacting to emerging attack vectors (e.g., as part of cybersecurity) can be a drain on resources; however, proactively addressing software security is a difficult proposition and still prone to human error. Indeed, it can be challenging to monitor all systems and code.

In order to address software security, an attack countermeasure can be utilized and deployed to a class of devices. If an attacker can decode the attack countermeasure, or defense model used, it can be used as a basis for attack development and/or attacks on other devices from that class.

BRIEF SUMMARY

Methods for the automated deployment of relocatable code blocks as an attack countermeasure are described. The described methods include randomly deploying and monitoring decoy duplicated copies of instrumented code blocks along with the 'real' instrumented code block in memory on a computing device to ensure that an attacker cannot easily find and attack the 'real' instrumented code block. The described methods can include or can be used in conjunction with a monitoring system that can detect or identify a potential attack during execution of a software program.

A computer implemented method includes receiving, for execution by a processing element, a relocatable instrumented code block, the relocatable instrumented code block being code that has undergone instrumentation for a monitoring system, duplicating at least one function of the relocatable instrumented code block to produce a plurality of duplicate relocatable code blocks, allocating the instrumented code block and each duplicate relocatable code block of the plurality of duplicate relocatable code blocks to different locations in a memory on a computing device, creating a relocated mapping of the instrumented code block and each duplicate relocatable code block to their corresponding locations in the memory, and transmitting a copy of the mapping of the instrumented code block and each duplicate relocatable code block to their corresponding locations in memory to the monitoring system.

A computer-readable storage medium is provided. The computer-readable storage medium has instructions stored thereon that when executed perform a method. The method includes receiving, at a monitoring system, for an executable code comprising a relocatable instrumented code block, a mapping of the instrumented code block and decoy duplicate relocatable code blocks to respective corresponding locations in memory on a computing device. During runtime of the executable code, the monitoring system monitors the executable code for execution of any of the decoy duplicate relocatable code blocks. Responsive to determining that any of the decoy duplicate relocatable code blocks has been accessed, the monitoring system generates a notification that a decoy duplicate instrumented code block has been accessed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Methods for the automated deployment of secret attack countermeasures are described. The methods include randomly deploying and monitoring decoy duplicated copies of instrumented code blocks along with the 'real' instrumented code block in memory on a computing device to ensure that an attacker cannot easily find and attack the 'real' instrumented code block.

The instrumented code block may include an embedded attack countermeasure that can be a sensor configuration embedded within the instrumented code. The static sensor configuration can be embedded by a code developer within a code as an attack countermeasure to alert a defender of access to the code by the malicious actor, e.g., an attacker. However, to work effectively against the attacker, the sensor configuration needs to be kept secret. If the sensor configuration is discovered by the attacker, the attacker can simply avoid it. For example, if the executable code is publicly known and accessible to the attacker, the location of the sensor configuration within the code may be conspicuous. In addition, if a class of devices shares a sensor configuration, then that configuration is a de facto class secret. A compromise of one device is a compromise of all the devices sharing the class secret. Therefore, if the attacker knows, or can figure out, the location of the sensor configuration within the code, e.g., because the source code is accessible to the attacker, the attacker can avoid the embedded attack countermeasures. By adding another layer of security as described herein, it is possible to further frustrate the efforts of the attackers. By randomly deploying duplicate copies of instrumented code in memory and monitoring all of the code blocks for access, knowledge of the location of the embedded sensor configuration within the code can be kept secret.

Figure 1:
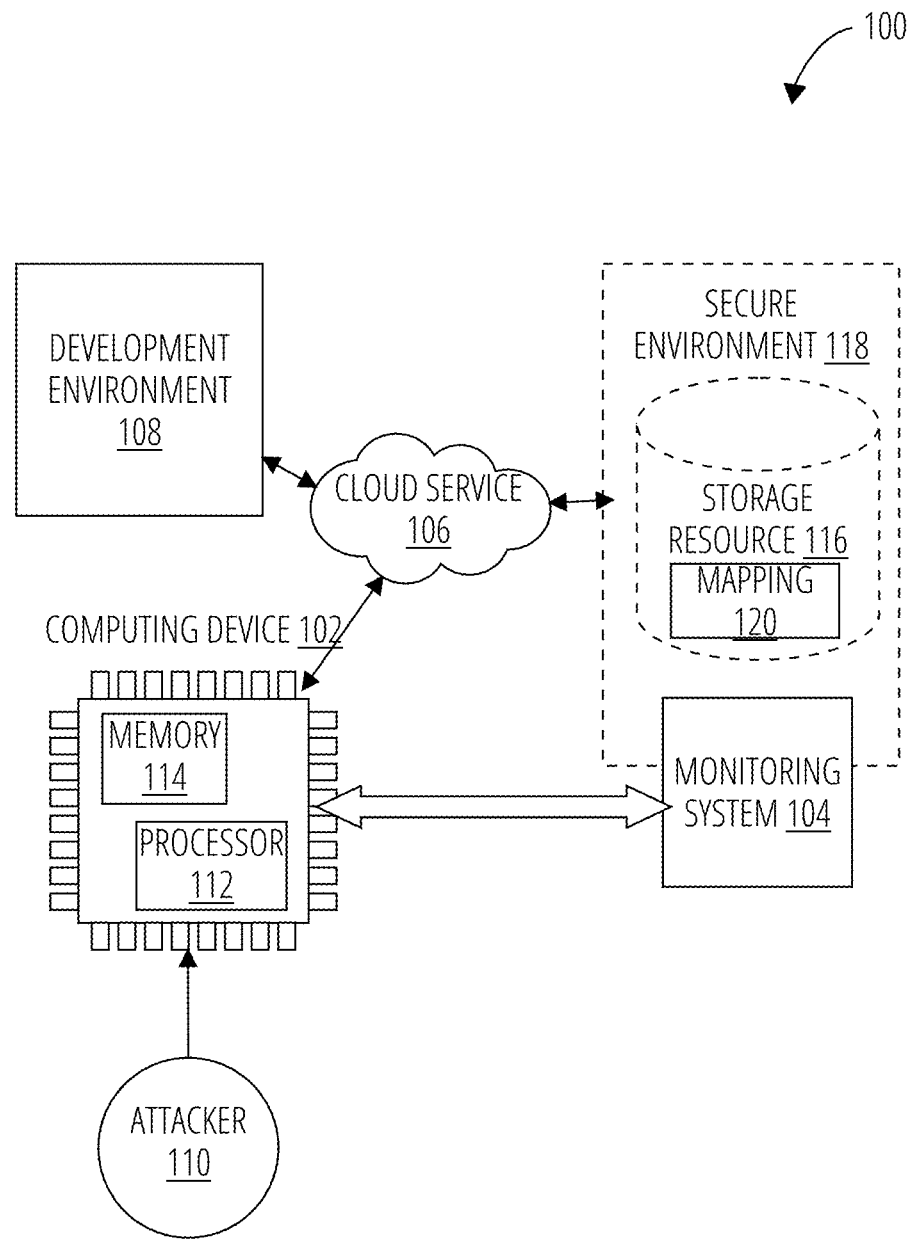
FIG. 1 illustrates an operating environment in which software is developed, deployed, and run.

FIG. 1 illustrates an operating environment in which software is developed, deployed, and run. Referring to FIG. 1, operating environment 100 includes a computing device 102, which may be embodied as described with respect to FIG. 7A, and a monitoring system 104, which may be part of computing device 102 or a separate computing device, embodied as described with respect to FIG. 7B, in communication with computing device 102. While one computing device 102 is shown for illustrative purposes, computing device 102 can represent multiple computing devices forming a class of computing devices. A cloud service 106 on a cloud-based server can establish communication with both a development environment 108, the computing device 102, and the monitoring system 104. The cloud service 106 can facilitate delivery of the compiled code to the computing device 102. An attacker 110 desires access to the confidential code on the computing device 102, which can include access to a sensor configuration within the confidential code, for malicious purposes.

Software developers can develop source code within the Development environment 108. The development environment 108 is a tool used by software developers to efficiently develop a code or program. The Development environment 108 can include a compiler 202 that translates the source code from a high-level programming language to a lower level, such as to an intermediate representation, and ultimately, to executable code. The source code can also be compiled in a compiler in a cloud service 106, such as in the example of FIG. 2.

Within the development environment 108, instrumentation can be performed by the developer. In general, instrumenting code refers to introducing additional code or data without changing the behavior of the code for the purpose of analyzing and/or measuring the behavior of the code.

In some cases, the instrumentation includes performing a path profiling on the block of code to generate a particular path identifier for each path within the block of code. Path profiling algorithms count how often each path through a function or program is taken at runtime. The path profiling can be performed from a control flow graph of the intermediate representation using the Ball and Larus path profiling algorithm, for example. The Ball and Larus method of path profiling takes in a control flow graph and for any arbitrary path in the control flow graph, gives as an output an arithmetic that generates a particular path identifier, or path ID. Additionally, the Ball and Larus algorithm can determine the frequency of each control flow path in the program. Users can also specify particular path IDs that will generate an alert when executed.

The instrumentation can also include embedding a static sensor configuration within the code during development in the development environment 108. The static sensor configuration can include intentionally injected weak code. The intentionally injected weak code can be injected within the code during development to lure and confuse attackers, as a software honeypot, so that attackers cannot distinguish between a real coding weakness and the injected weak code. As an example, the intentionally weak code can include dead code, or code that under normal operating conditions should never get executed. While intentionally injected weak code has been described as the embedded sensor configuration, other sensor configurations can be embedded within the code such as memory addresses that are marked as non-executable.

The path profiling can include marking each weak code path within the code block by assigning an attribute to the weak code path, prior to the path profiling and then creating an embedded sensor configuration table so that each weak code path is mapped to its corresponding particular path identifier. The embedded sensor configuration table is provided to the monitoring system 104 so that the monitoring system 104 can identify whether the particular path identifiers of the intentionally injected weak code paths have been or are being executed.

While intentionally injected weak code has been described as the embedded sensor configuration, other sensor configurations can include as memory addresses associated with the code that are marked as non-executable. An internal table can be created listing the memory addresses associated with the code that are marked as non-executable. In another embodiment, the sensor configuration can include a list of relocatable addresses that should never be accessed.

Computing device 102 includes a processor 112 and memory 114. Although specific reference is made to a processor 112, processor 112 can be any processing element such as, but not limited to, a central processing unit (CPU), graphics processing unit (GPU), microcontroller, or computing unit (e.g., multiplier-accumulator (MAC) unit with memory). The processing element can also be virtualized, such as in emulated environments like QEMU (Quick Emulator). Memory 114 can include volatile and non-volatile memory hardware and can include built-in (e.g., system on a chip) and/or removable memory hardware. Examples of volatile memory include random-access memories (RAM, DRAM, SRAM). Examples of non-volatile memory include flash memory, various read-only memories (ROM, PROM, EPROM, EEPROM), phase change memory, magnetic and ferromagnetic/ferroelectric memories (MRAM, FeRAM). It should be understood that there are different levels/hierarchy of memory and components that may be used (e.g., cache memories, processor registers, system RAM, disk drives, secondary storage, etc.). The memory 114 can store a computer program, or the instrumented code with a sensor configuration, in the memory 114.

Although not shown in FIG. 1, computing device 102 typically includes an operating system or other piece of software that performs one or more functions of an operating system (e.g., which may be found as part of firmware). Functions of an operating system include a loader which loads a program, or code, into a memory space used by the processing element, performing relocation of code blocks or dynamic linking if necessary, directing the processing element to the memory address at which the program begins in order to begin execution of the program, supervising the code while the process code is running, responding to requests by the code for shared system resources, and removing the code (and other related data) from the memory space. The loader typically runs in kernel space, i.e., a secure environment on the computing device 102.

The monitoring system 104 can monitor activity on the computing device 102 with respect to executing the program. The monitoring system 104 can be associated with or have access to the storage resource 116 and a secure environment 118. The secure environment 118 may be a data center such as a cloud data center and may include specialized hardware such as a hardware security module (HSM). Monitoring system 104 includes a software program that can run in the secure environment 118.

Figure 2:
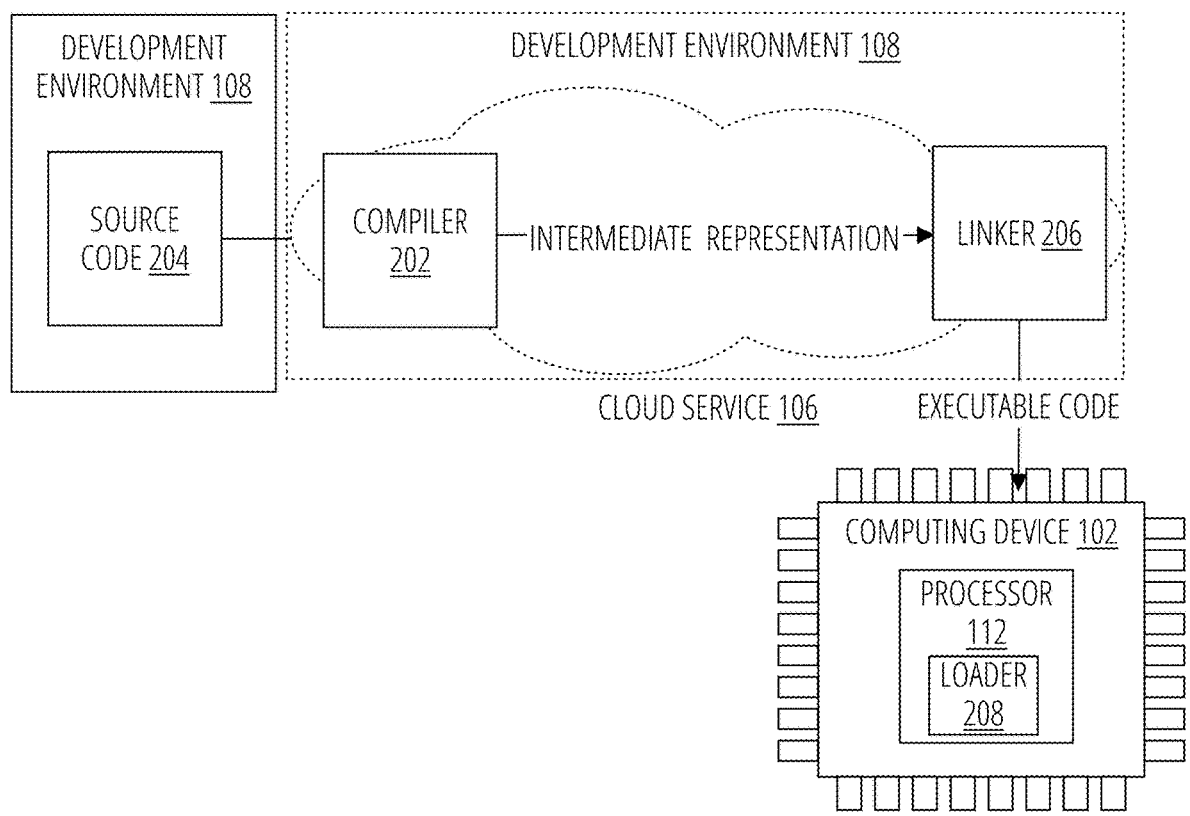
FIG. 2 illustrates the stages of code development and the entities involved with the production of the code.

FIG. 2 illustrates the stages of code development and the entities involved with the production of the code. After the source code 204 is developed, the source code 204 is compiled by the compiler 202 that translates the source code 204 from a high-level programming language to a lower level, such as to an intermediate representation, and ultimately, to executable code. The source code 204 can either be compiled by the IDE 108 or by a compiler in the cloud service 106 as indicated by the dotted lines in FIG. 2.

The source code 204 can be a production application code, for example. The code can be instrumented, e.g., including code in addition to the application code, for monitoring a behavior of the code. In some cases, the instrumented code includes a static sensor configuration embedded within the instrumented code for malicious software detection. The instrumented code with the sensor configuration can be deployed or otherwise provided to a computing device 102 for normal execution.

A linker 206 combines files of relocatable code in a functional order. The linker is typically located in the development environment 108 as shown, however, the linker 206 can also exist in the computing device 102. The linker can output relocatable code that can be modified by a loader 208. Then, as stated above, the loader 208 on the computing device 102 loads the linked code, into a memory space used by the processor 112, directing the processor 112 to the memory address at which the program begins to begin execution of the program.

Figure 3:
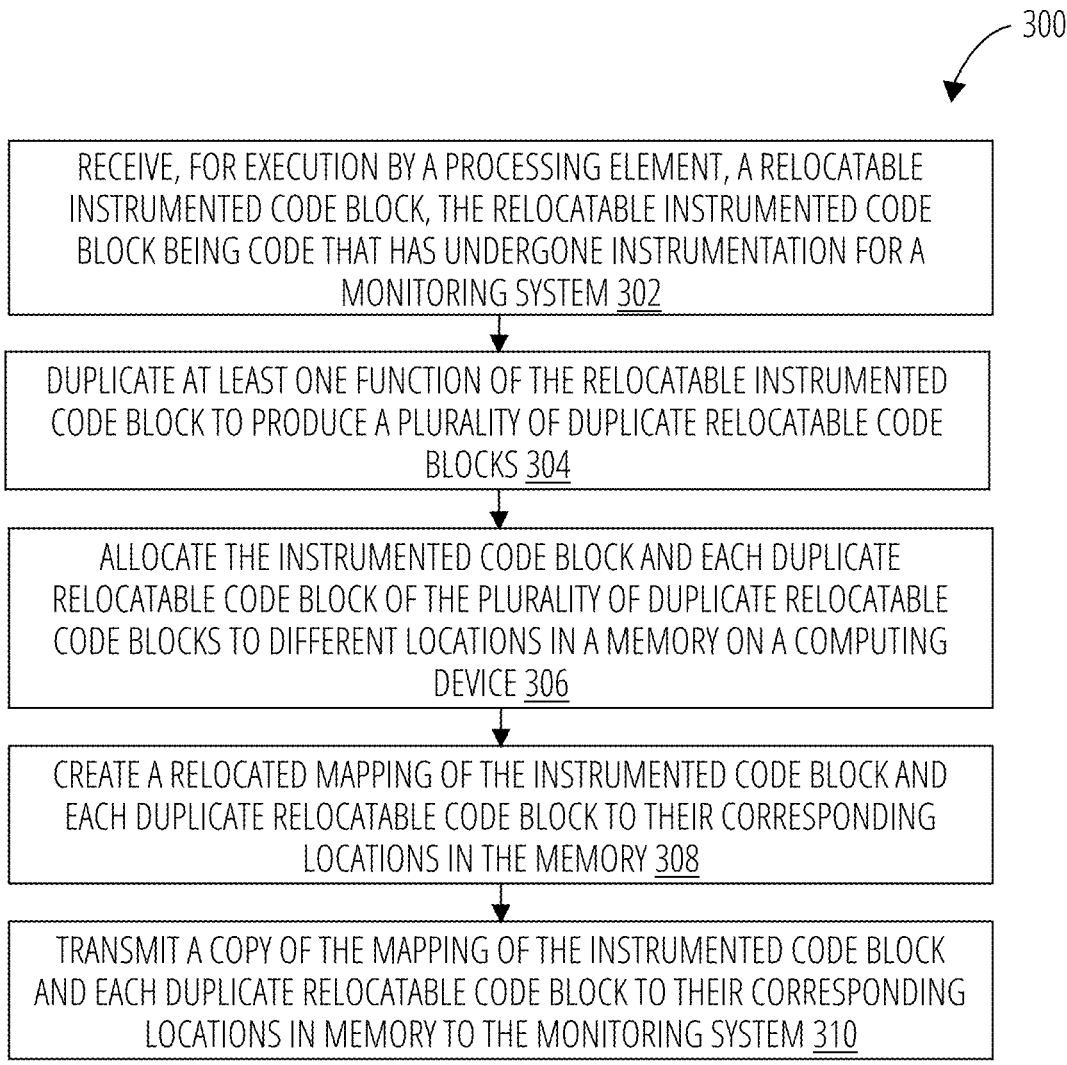
FIG. 3 illustrates a method for the automated deployment of relocatable code blocks as an attack countermeasure in accordance with one embodiment.

FIG. 3 illustrates a method for the automated deployment of relocatable code blocks as an attack countermeasure in accordance with an embodiment. Method 300 is automatically performed dynamically, e.g., prior to runtime, on a computing device such as described with respect to FIG. 7A. In some cases, method 300 is performed within a secure environment on the computing device 102. Referring to FIG. 3, method 300 includes receiving (302) for execution by a processing element, a relocatable instrumented code block, the relocatable instrumented code block being code that has undergone instrumentation for a monitoring system. Method 300 further includes creating dynamic software tripwires by duplicating (304) the instrumented code block to produce a plurality of duplicate relocatable code blocks, allocating (306) the instrumented code block and each duplicate relocatable code block of the plurality of duplicate relocatable code blocks to a different locations in a memory on a computing device, and creating (308) a relocated mapping of the instrumented code block and each duplicate relocatable code block to the corresponding location in memory on the computing device. Method 300 further includes transmitting (310) a copy of the mapping of the instrumented code block and each duplicate relocatable code block to their corresponding locations in memory to the monitoring system.

Method 300 includes receiving (302), by the computing device 102, a relocatable instrumented code block for execution by processor 112. In general, relocatable code refers to code that can be loaded anywhere in memory, e.g., code whose execution address can be changed. In addition, relocatable code can be reordered in memory by a loader. Referring back to FIG. 1, the relocatable instrumented code block can be an instrumented block of code from a code developed in the development environment 108. The instrumentation can be performed in the development environment 108 or by the cloud service 106. In a specific implementation, the relocatable instrumented code block is received along with a description of the instrumentation configuration. In order to keep the instrumentation secret, the description of the instrumentation will need to be encrypted and received in a secure environment of the computing device 102.

Method 300 further includes creating dynamic software tripwires. By duplicating functions of instrumented code blocks, allocating the instrumented code block to different locations in memory, e.g., relocation, and marking the duplicate functions so that the monitoring system 104 knows which instrumented code blocks are duplicates and should never be accessed during normal execution, a dynamic software tripwire can be created. A software tripwire is a cybersecurity approach that defines a portion of memory that should never be reached or accessed. When that portion of memory is accessed, e.g., the tripwire is tripped, the tripwire sends a notification that an attack has occurred. The duplicate functions in the relocatable code blocks can therefore be used as decoys. Anytime the decoy duplicate functions get accessed, an alert can be sent out that a potential attack has occurred on the computing device 102.

Figure 4:
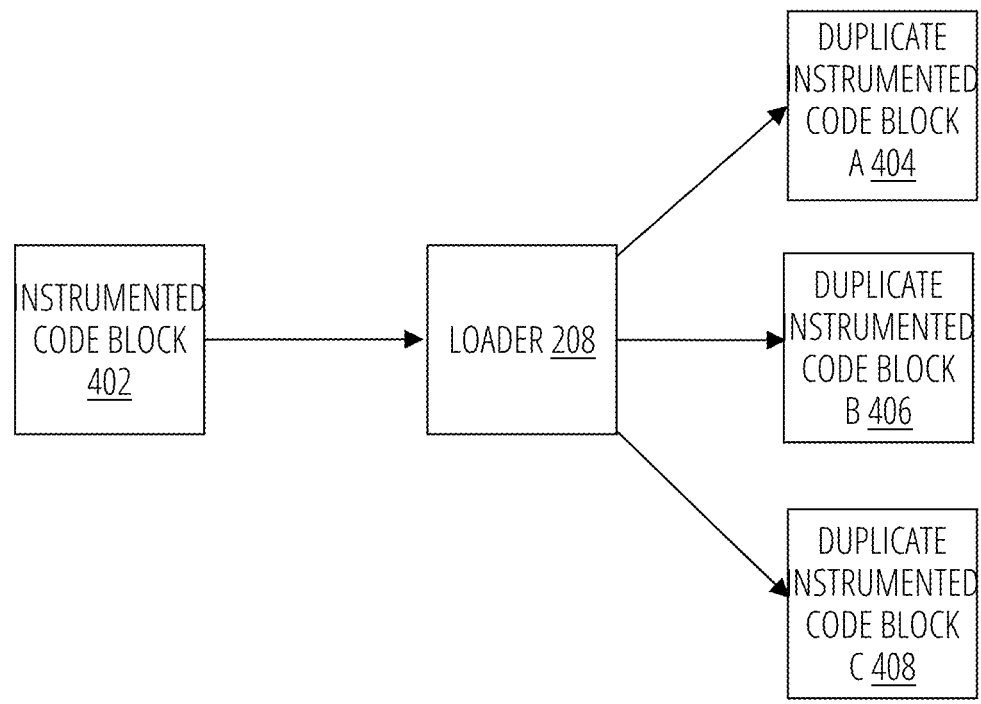
FIG. 4 illustrates an exemplary implementation of duplication of instrumented code blocks performed by a loader in accordance with an embodiment.

Method 300 further includes duplicating (304) functions of relocatable instrumented code blocks. FIG. 4 illustrates an exemplary implementation of duplication of instrumented code blocks performed by a loader in accordance with an embodiment. For example, referring to FIG. 4, the loader 208 has duplicated relocatable instrumented code block 402 three times to produce relocatable code blocks, duplicate instrumented code block A 502, duplicate instrumented code block B 504, and duplicate instrumented code block C 506.

In some cases, the duplication can be accomplished by mapping the same page of physical memory to different virtual addresses. The software tripwire, in this case, can be implemented as a decoy page being marked as readable while the 'real', e.g., non-decoy page marked as readable and executable. In some cases, the duplication can be accomplished utilizing an MMU (memory management unit) such that an additional page-table entry is used for the duplicate page, while pointing to the same physical memory. The 'real' instrumented code block is marked read/execute while each of the duplicate instrumented code blocks are marked 'read only.' When an attacker 110 attempts to use any of the duplicate instrumented code blocks, an access violation is generated.

Figure 5:
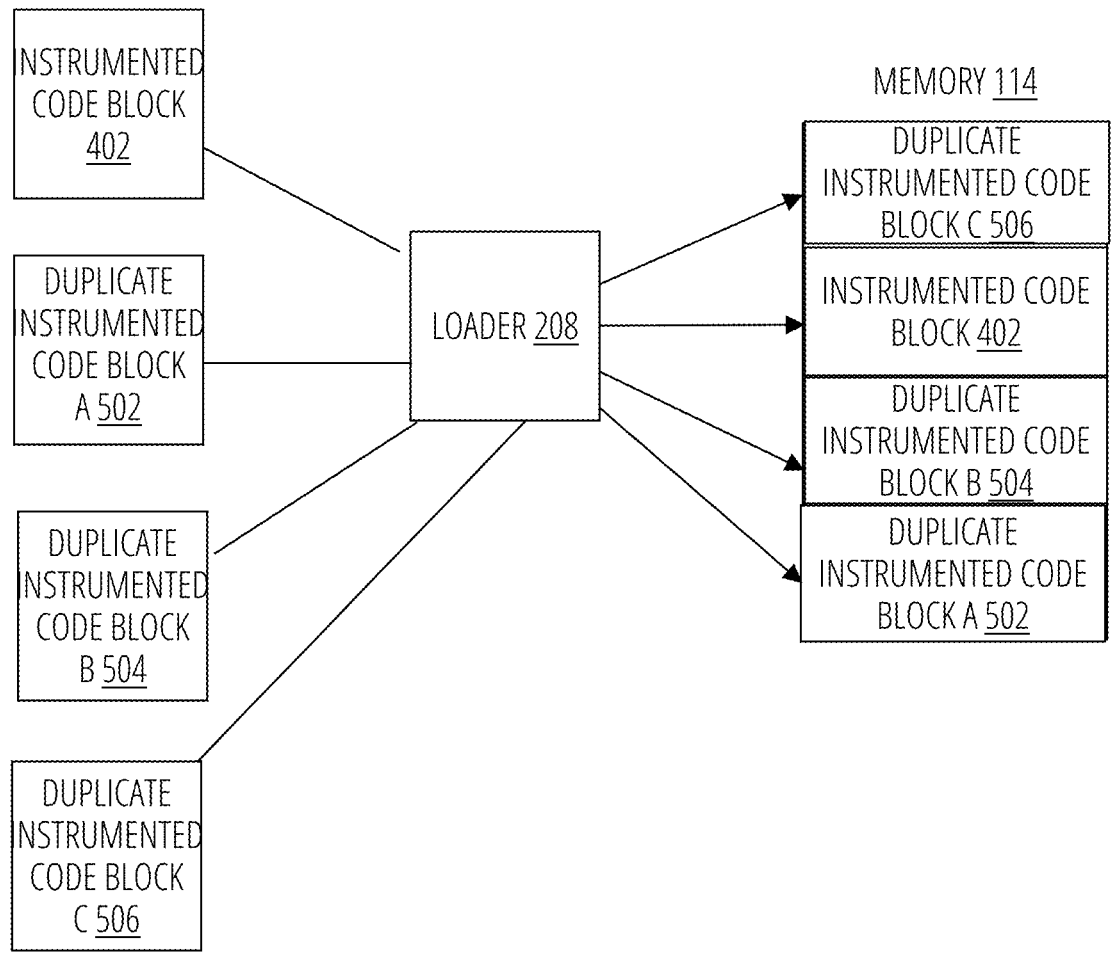
FIG. 5 illustrates an exemplary implementation of fine-grained address space layout randomization performed by a loader in accordance with an embodiment.

Method 300 further includes allocating (306) the instrumented code block and each duplicate relocatable code block of the plurality of relocatable duplicate code blocks to different locations in a memory on a computing device. In some cases, the allocating step includes the process of fine-grained address space layout randomization. An example is illustrated in FIG. 5, described below. Fine-grained address space layout space randomization is an attack countermeasure that makes it difficult for the attacker 110 to predict the location in memory of the instrumented code blocks. In the fine-grained address space layout randomization process, the order of the functions in the code is randomly permutated. The fine-grained address space randomization process is performed by loader 208 such that the loader 208 takes the instrumented code block and the relocatable code blocks with relocatable data and redistributes them at random into different locations in memory 114. Thus, the function order that the linker 206 originally chose is recalculated, or shuffled, by the loader 208. In some cases, the loader will need to adjust the instrumentation and/or the instrumentation configuration to take the different locations in memory of the relocatable code blocks into account. In an embodiment, allocating the relocatable instrumented code block includes rotating the relocatable instrumented code block through locations in the memory allocated to the duplicate relocatable code blocks at runtime.

FIG. 5 illustrates an exemplary implementation of fine-grained address space layout randomization performed by the loader in accordance with an embodiment. Referring to the left side of FIG. 5, the instrumented code block 402 and relocatable code blocks, duplicate instrumented code block A 502, duplicate instrumented code block B 504, and duplicate instrumented code block C 506 exist in memory in a particular order. Prior to runtime, the loader 208 randomly chooses a different order for each of the code blocks to be placed in memory 114. The loader 208 then relocates the relocatable code blocks. On the right side of FIG. 5, memory 114 is shown with each of the relocatable code blocks, instrumented code block 402, duplicate instrumented code block A 502, duplicate instrumented code block B 504, and duplicate instrumented code block C 506, in a different order than on the left side corresponding to a different location in memory 114.

Returning to FIG. 3, method 300 further includes creating a mapping (308) of the instrumented code block and each duplicate relocatable code block to their corresponding locations in the memory 114 for use by the monitoring system 104. When the loader 208 relocates the code blocks, (e.g., instrumented code block 402, duplicate instrumented code block A 502, duplicate instrumented code block B 504, and duplicate instrumented code block C 506), the computing device 102 (through, for example, operating system 704) creates an internal table having a mapping 120.

The computing device 102 transmits (310) a copy of the mapping 120 to the monitoring system 104. From the table/mapping 120, the monitoring system 104 knows the location in memory 114 of each code block and which one is the 'real' copy, e.g., the instrumented code block 402, and which are the 'decoy' copies, e.g., the duplicate relocatable code blocks, duplicate instrumented code block A 502, duplicate instrumented code block B 504, and duplicate instrumented code block C 506. The monitoring system 104 can then identify access to each of the duplicate relocatable code blocks as well as the instrumented code block 402.

Figure 7A:
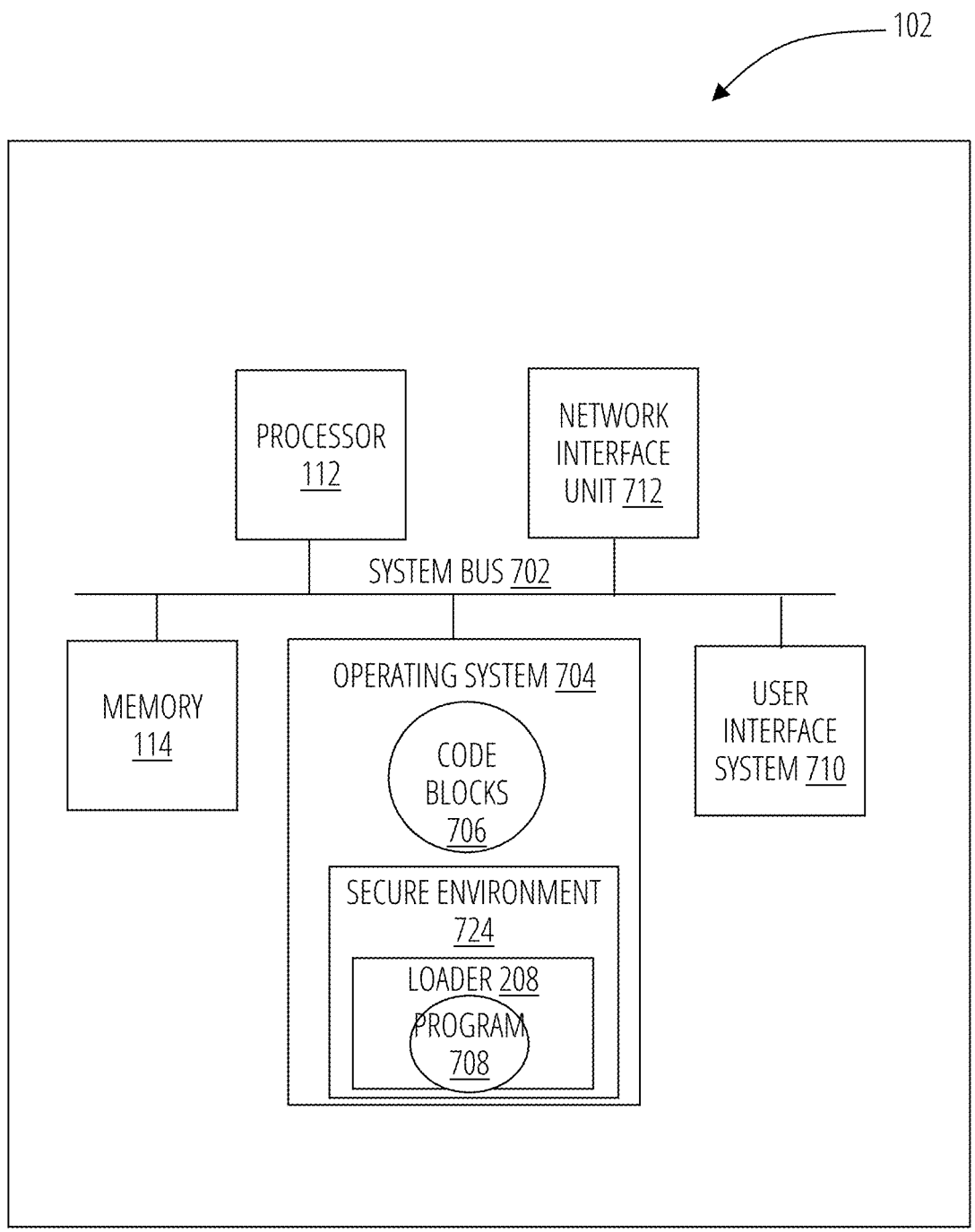
FIG. 7A illustrates a schematic diagram illustrating components of a computing system.
Figure 7B:
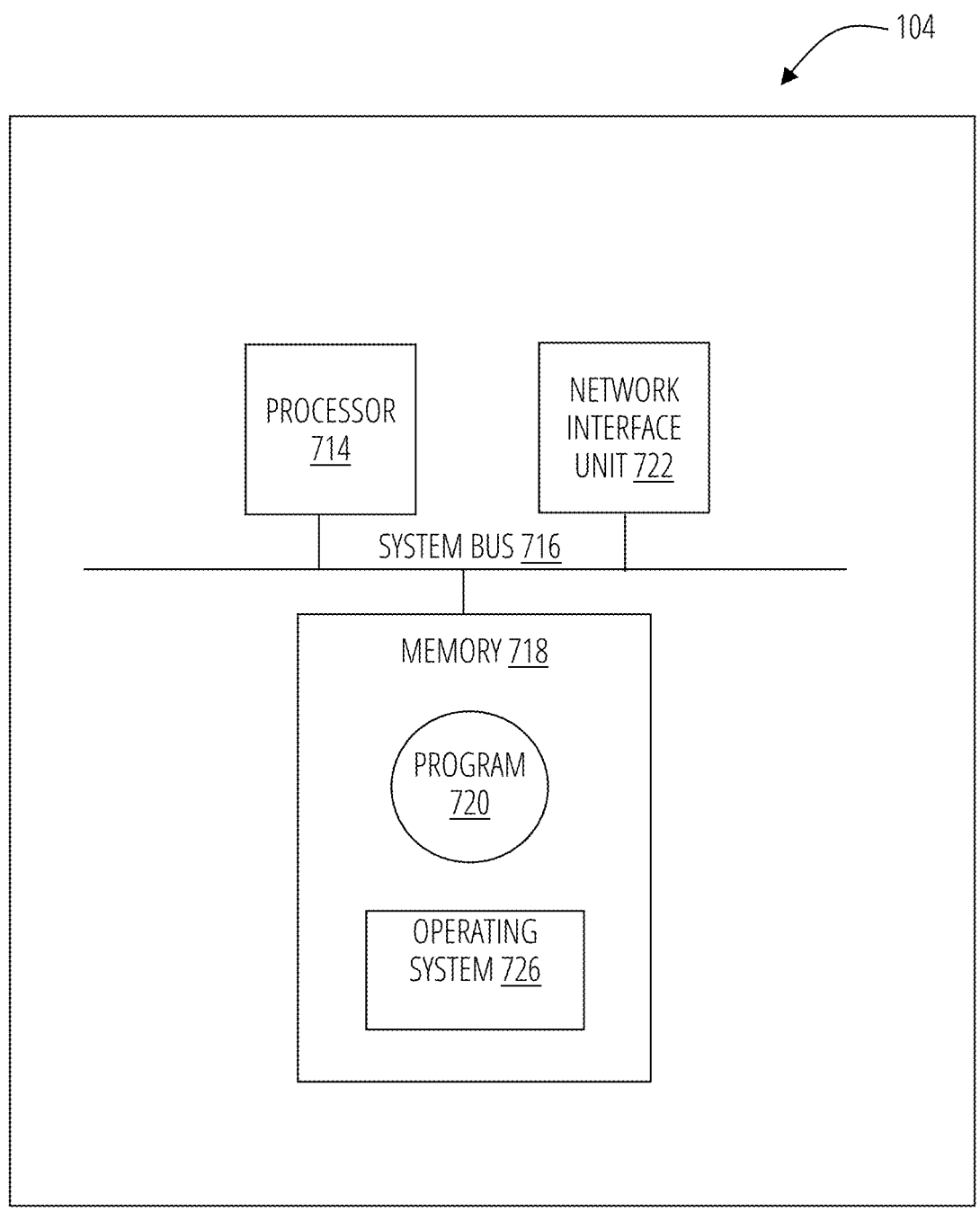
FIG. 7B illustrates a schematic diagram illustrating components of a monitoring system.

With reference to FIG. 1 and FIG. 7B, monitoring system 104 monitors the instrumented executable code blocks corresponding to instrumented code block 402, duplicate instrumented code block A 404, duplicate instrumented code block B 406, and duplicate instrumented code block C 408 running on computing device 102 during runtime. In order to keep the mapping 120 secure, e.g., inaccessible to the attacker 110, the monitoring system 104 runs in the secure environment 118.

Figure 6:
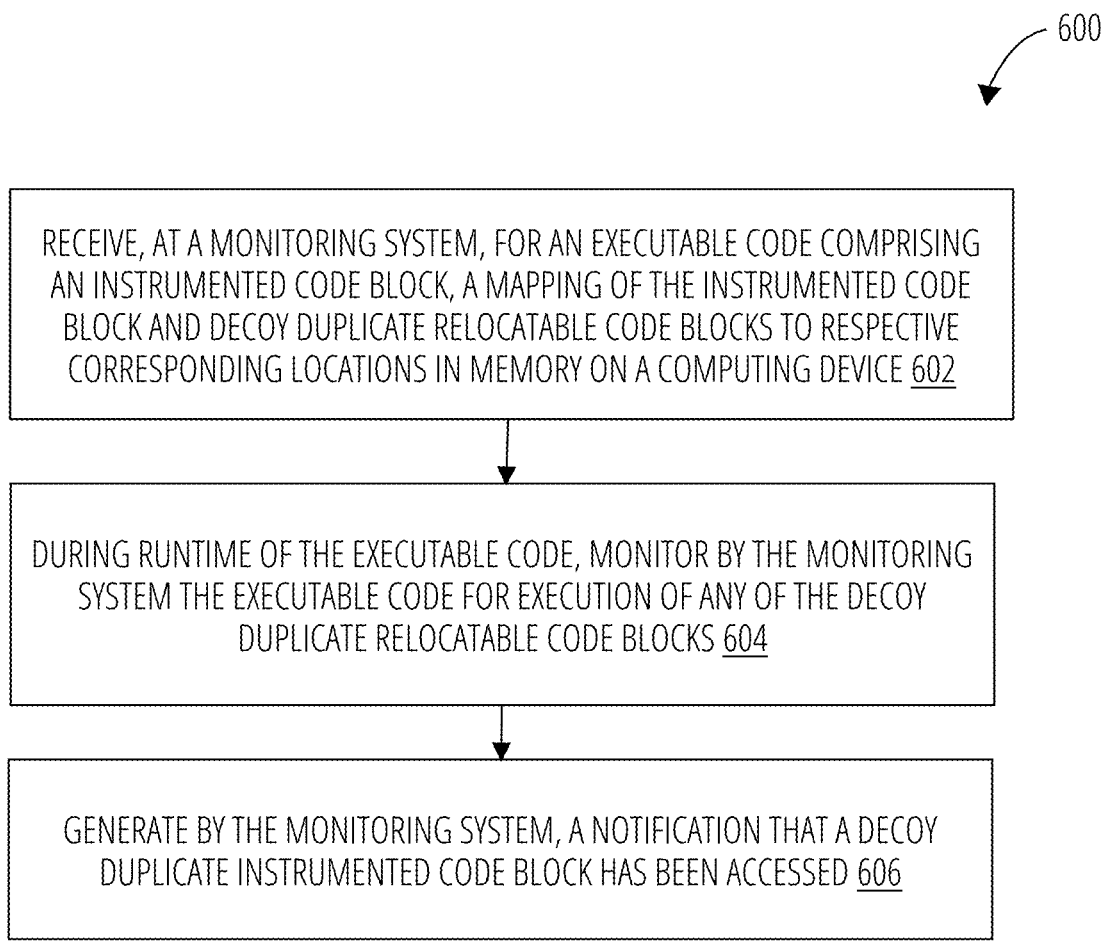
FIG. 6 illustrates a monitoring process in accordance with one embodiment.

FIG. 6 illustrates a monitoring process in accordance with an embodiment. The monitoring process is performed by the monitoring system 104. Process 600 receives (602), at the monitoring system 104, for an executable code comprising an instrumented code block a first mapping of the instrumented code block and decoy duplicate relocatable code blocks to respective corresponding locations in memory on a computing device. During runtime of the executable code, process 600 monitors (404) the executable code for execution of any of the decoy duplicate relocatable code blocks. The monitoring system 104 uses the mapping 120 stored in storage resource 116 to monitor the instrumented executable code blocks for the execution of any of the decoy duplicate relocatable code blocks. Responsive to determining that any of the decoy duplicate relocatable code blocks has been accessed, process 600 generates (406) a notification that a decoy duplicate instrumented code block has been accessed. The notification can then be sent to another application to be stored or used by the application to perform a mitigation.

In an embodiment, when the instrumentation includes embedding a static sensor configuration, e.g., intentionally weak code paths, within the code and a path profiling has been done to create a particular path identifier for each path within the code block, the monitoring system 104 receives the embedded sensor configuration table indicating the path identifiers of the weak code paths injected. When a path having the particular path identifier corresponding to a weak code path is executed the monitoring system 104 is alerted by this trigger that access of a location in in memory corresponding to a decoy duplicate instrumented code block has occurred. The trigger causes the monitoring system 104 to generate a notification that a decoy duplicate instrumented code block has been accessed.

In another embodiment, when the instrumentation includes a sensor configuration including memory addresses associated with the relocatable instrumented code block that are marked as non-executable, the monitoring system 104 receives an internal table listing the memory addresses associated with the relocatable instrumented code block that are marked as non-executable. When a memory address associated with relocatable instrumented code block is marked as non-executable is executed, the monitoring system 104 is alerted by this trigger that execution of a memory address marked as non-executable within the relocatable instrumented code block has occurred. The trigger causes the monitoring system 104 to generate a notification that a relocatable instrumented code block has been accessed.

FIG. 7A illustrates a schematic diagram illustrating components of a computing device. It should be understood that aspects of the system described herein are applicable to both mobile and traditional desktop computers, as well as server computers and other computer systems. Components of computing device 102 may represent a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen as some examples. Accordingly, more or fewer elements described with respect to computing device 102 may be incorporated to implement a particular computing system.

Referring to FIG. 7A, a computing device 102 can include at least one processor 112 connected to components via a system bus 702, a memory 114, and an operating system 704. A processor 112 processes data according to instructions of the code blocks 706, e.g., instrumented code block 402 and the relocatable duplicate code blocks, e.g., duplicate instrumented code block A 502, duplicate instrumented code block B 504, and duplicate instrumented code block C 506, and/or operating system 704. The code blocks 706 may be loaded into the memory 114 and run on or in association with the operating system 704. The loader 208 may include the program 708 running method 300 as described. The loader 208 operates within a secure environment 118 on the computing device 102. The computing device 102 can further include a user interface system 710, which may include input/output (I/O) devices and components that enable communication between a user and the computing device 102. Computing device 102 may also include a network interface unit 712 that allows the system to communicate with other computing devices, including server computing devices and other client devices, over a network.

FIG. 7B illustrates a schematic diagram illustrating components of a monitoring system. It should be understood that aspects of the system described herein are applicable to both mobile and traditional desktop computers, as well as server computers and other computer systems. Accordingly, more or fewer elements described with respect to monitoring system may be incorporated to implement a particular computing system that is separate from computing device 102.

Referring to FIG. 7B, monitoring system 104 can include at least one processor 714 connected to components via a system bus 716, a memory 718 storing instructions for performing program 720, and a network interface unit 722 that enables the monitoring system 104 to communicate with computing device 102 and other devices over a network. The processor 714 can be any processing element such as, but not limited to, a CPU, GPU, microcontroller, or computing unit (e.g., MAC unit with memory). Memory can include volatile and non-volatile memory hardware and can include built-in (e.g., system on a chip and/or removable memory hardware. Examples of volatile memory include random-access memories (RAM, DRAM, SRAM). Examples of non-volatile memory include flash memory, various read-only memories (ROM, PROM, EPROM, EEPROM), phase change memory, magnetic and ferromagnetic/ferroelectric memories (MRAM, FeRAM). Although a single memory block is shown in the drawing, it should be understood that there are different levels/hierarchy of memory and components that may be used (e.g., cache memories, processor registers, system RAM, disk drives, secondary storage, etc.).

Figure 8:
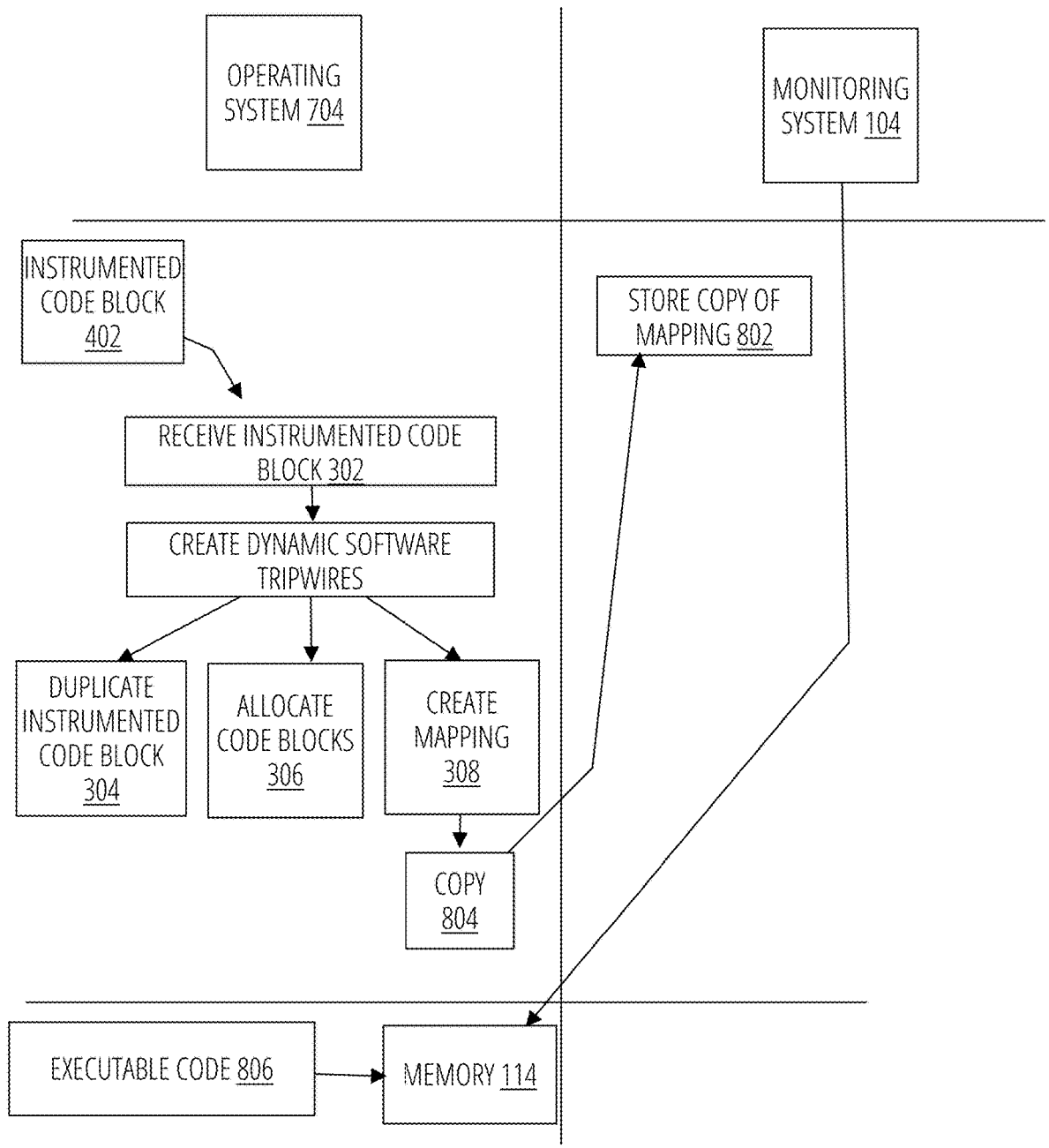
FIG. 8 illustrates a flow diagram of information between different components found within the operating environment in accordance with one embodiment.

FIG. 8 illustrates a flow diagram of information between different components found within operating environment 100. The operating system 704 and the monitoring system 104 can both reside on computing device 102 or on different computing devices.

The operating system 704 on the computing device 102 receives the instrumented code block 402. Utilizing the instrumented code block 402, the operating system 704 creates dynamic software tripwires. The operating system 704 generates (304) duplicate relocatable blocks of a legitimate function, allocates (306) the code blocks, e.g., relocatable instrumented code block 402 and the relocatable duplicate code blocks, to different locations in memory, and creates (308) a mapping 120 of the codes blocks to their respective corresponding locations in memory. A copy 804 of the mapping 120 is transmitted to the monitoring system 104 where it is stored (802).

When the executable code 806, including instrumented code block 402, duplicate instrumented code block A 502, duplicate instrumented code block B 504, and duplicate instrumented code block C 506, runs on the computing device 102, the monitoring system 104 is provided access to the memory 114 so that it can monitor the executable code 806 for execution of the any of the decoy duplicate relocatable code blocks using the copy 804 of mapping 120.

In operation, the proposed method creates and deploys decoy duplicate relocatable blocks as dynamic software tripwires. The loader of the OS of the computing device on which the duplicate relocatable blocks are deployed generates duplicate relocatable blocks of a legitimate function to obfuscate the real function from the attacker. In addition, the code blocks, e.g., the relocatable instrumented code block and the duplicate relocatable code blocks, can also have a second layer of defense with the embedded sensor configuration so that if the attacker is able to access the 'real' code block, e.g., instrumented code block, the sensor configuration, e.g., intentionally weak code, is still embedded within the instrumented code block. When the attacker attempts to access the sensor configuration, a notification is sent by the monitoring system as an alert to a potential attack. Thus, the attacker's attack surface has been reduced. Furthermore, by deploying multiple copies of one or more functions on a computing device having the identical or similar sensor configuration, attacks utilizing the same attack strategy on other devices of the same class with the identical or similar sensor configuration can be prevented.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A computer implemented method, comprising:
   receiving, for execution by a processing element, a relocatable instrumented code block, the relocatable instrumented code block being code that has undergone instrumentation for a monitoring system;
   creating dynamic software tripwires by:
      duplicating at least one function of the relocatable instrumented code block to produce a plurality of duplicate relocatable code blocks;
      allocating the instrumented code block and each duplicate relocatable code block of the plurality of duplicate relocatable code blocks to different locations in a memory on a computing device; and
      creating a relocated mapping of the instrumented code block and each duplicate relocatable code block to their corresponding locations in the memory; and
   transmitting a copy of the mapping of the instrumented code block and each duplicate relocatable code block to their corresponding locations in memory to the monitoring system.

2. The method of claim 1, wherein receiving the relocatable instrumented code block includes receiving a description of an instrumentation configuration.

3. The method of claim 2, wherein the instrumentation includes a path profiling on a code block to generate a particular path identifier for each path within the code block.

4. The method of claim 3, wherein the instrumentation includes an embedded sensor configuration within the code block.

5. The method of claim 4, wherein the embedded sensor configuration comprises intentionally injected weak code.

6. The method of claim 5, wherein the path profiling includes creating the description of the instrumentation configuration, wherein the description of the instrumentation configuration includes an embedded sensor configuration table comprising a listing of the particular path identifier to the path of the corresponding intentionally injected weak code.

7. The method of claim 2, wherein the instrumentation includes marking an address of a code block as non-executable and wherein the description of the instrumentation includes an internal table comprising the address of the code marked as non-executable.

8. The method of claim 1, wherein allocating the relocatable instrumented code block and each duplicate relocatable code block of the plurality of relocatable code blocks further comprises fine grained address space randomization.

9. The method of claim 8, wherein allocating the relocatable instrumented code block includes rotating the relocatable instrumented code block through locations in the memory allocated to the duplicate relocatable code blocks at runtime.

10. The method of claim 1, wherein the method is automatically performed by a loader of an operating system of the computing device.

11. The method of claim 10, wherein the method is performed by the loader within a secure environment on the computing device.

12. A computer-readable storage medium, comprising a memory having instructions stored thereon that when executed perform a method, the method comprising:
receiving, at a monitoring system, for an executable code comprising a relocatable instrumented code block, a mapping of the instrumented code block and decoy duplicate relocatable code blocks to respective corresponding locations in memory on a computing device;
during runtime of the executable code, monitoring by the monitoring system the executable code for execution of any of the decoy duplicate relocatable code blocks; and
responsive to determining that any of the decoy duplicate relocatable code blocks has been accessed, generating by the monitoring system, a notification that a decoy duplicate instrumented code block has been accessed.

13. The computer-readable storage medium of claim 12, wherein the method is performed within a secure environment.

14. The computer-readable storage medium of claim 12, wherein execution of a decoy duplicate relocatable code block is determined by receipt of a trigger indicated by instrumentation of the relocatable instrumented code block occurring upon access of a location in memory corresponding to the decoy duplicate relocatable code block.

15. The computer-readable storage medium of claim 14, wherein the instructions perform a further method comprising:
receiving, at the monitoring system, an embedded sensor configuration table for the instrumentation indicating path identifiers of weak code paths injected for an attack countermeasure,
wherein the trigger is execution of a path having a particular path identifier corresponding to weak code path indicated by the embedded sensor configuration table.

16. The computer-readable storage medium of claim 14, wherein the instructions perform a further method comprising:
receiving, at the monitoring system, an internal table for the instrumentation indicating memory addresses that should not be executed,
wherein the trigger is execution of a memory address of the memory addresses that should not be executed indicated by the internal table.

* * * * *